United States Patent
Das et al.

(10) Patent No.: US 11,144,419 B2
(45) Date of Patent: Oct. 12, 2021

(54) CONTROLLED USE OF A MEMORY MONITOR INSTRUCTION AND MEMORY WAIT INSTRUCTION IN A VIRTUALIZED ENVIRONMENT

(71) Applicant: Red Hat, Inc., Raleigh, NC (US)

(72) Inventors: Bandan Das, Westford, MA (US); Karen L. Noel, Westford, MA (US)

(73) Assignee: Red Hat, Inc., Raleigh, NC (US)

(*) Notice: Subject to any disclaimer, the term of this patent is extended or adjusted under 35 U.S.C. 154(b) by 168 days.

(21) Appl. No.: 16/663,570

(22) Filed: Oct. 25, 2019

(65) Prior Publication Data

US 2021/0124662 A1    Apr. 29, 2021

(51) Int. Cl.
    *G06F 9/455*    (2018.01)
    *G06F 11/30*    (2006.01)

(52) U.S. Cl.
    CPC ........ *G06F 11/301* (2013.01); *G06F 9/45558* (2013.01); *G06F 11/3037* (2013.01); *G06F 2009/45562* (2013.01); *G06F 2009/45575* (2013.01); *G06F 2009/45583* (2013.01); *G06F 2009/45591* (2013.01)

(58) Field of Classification Search
    CPC .................................................. G06F 9/45558
    See application file for complete search history.

(56) References Cited

U.S. PATENT DOCUMENTS

| | | |
|---|---|---|
| 8,738,972 B1 | 5/2014 | Bakman et al. |
| 9,606,825 B2 | 3/2017 | Tsirkin et al. |
| 10,073,711 B2 | 9/2018 | Zheng et al. |
| 2017/0090963 A1* | 3/2017 | Nakajima ........... G06F 9/45558 |
| 2018/0357093 A1* | 12/2018 | Cong .................. G06F 21/6281 |

FOREIGN PATENT DOCUMENTS

CN          100514297 C      7/2009

OTHER PUBLICATIONS

Author Unknown, "Hyper-V Limit Processor Functionality to Run an Older Operating System such as Windows NT on this Virtual Machine," Agile Insider Blog, May 4, 2008, Agile IT, Inc., 8 pages.
Author Unknown, "Monitoring Applications in Virtualized Environments," Chapter: Virtualization and Cloud Performance, www.dynatrace.com/resources/ebooks/javabook/monitoring-applications-in-virtualized-environments/, accessed Aug. 16, 2019, 7 pages.
Uhlig, Rich, et al., "Intel Virtualization Technology," Computer, 2005, IEEE Computer Society, pp. 48-56.

* cited by examiner

*Primary Examiner* — Charlie Sun
(74) *Attorney, Agent, or Firm* — Withrow & Terranova, PLLC

(57) ABSTRACT

Controlled use of a memory monitor instruction and memory wait instruction in a virtualized environment. A hypervisor executing on a computing host determines that a first process executing in a virtual machine (VM) attempted to execute a memory monitor instruction. The hypervisor determines a memory range associated with the memory monitor instruction. A virtual machine control structure that corresponds to the VM is altered to prevent a virtual machine exit upon a subsequent execution of a memory wait instruction by the first process. The hypervisor executes the memory monitor instruction to cause the memory range to be monitored for a store command to the memory range. The hypervisor returns control to the first process to begin execution at an instruction after the memory monitor instruction.

20 Claims, 8 Drawing Sheets

CONTROLLED USE OF A MEMORY MONITOR INSTRUCTION AND MEMORY WAIT INSTRUCTION IN A VIRTUALIZED ENVIRONMENT

BACKGROUND

Modern computing devices can be configured with substantial amounts of memory, and include one or more processing devices, each of which may have multiple processor cores that can process executable software instructions concurrently. A virtualized environment, such as an environment running multiple virtual machines on a single computing host, generally facilitate more efficient utilization of hardware by sharing processor cores and memory across multiple different virtual machines.

SUMMARY

The examples disclosed herein allow the controlled use of a memory monitor instruction and a monitor wait instruction in a virtualized environment, allowing power-optimized execution of a processor core by a virtual machine but controlling such use to ensure the capability is not abused.

In one example a method is disclosed. The method includes determining, by a hypervisor executing on a computing host, that a first process executing in a virtual machine (VM) attempted to execute a memory monitor instruction. The method further includes determining a memory range associated with the memory monitor instruction. The method further includes altering a virtual machine control structure (VMCS) that corresponds to the VM to prevent a virtual machine exit (VMEXIT) upon a subsequent execution of a memory wait instruction by the first process. The method further includes executing, by the hypervisor, the memory monitor instruction to cause the memory range to be monitored for a store command to the memory range. The method further includes returning control, by the hypervisor, to the first process to begin execution at an instruction after the memory monitor instruction.

In another example a computing host is provided. The computing host includes a memory and a processor device coupled to the memory. The processor device is to determine, by a hypervisor executing on the processor device, that a first process executing in a VM attempted to execute a memory monitor instruction. The processor device is further to determine a memory range associated with the memory monitor instruction. The processor device is further to alter a VMCS that corresponds to the VM to prevent a VMEXIT upon a subsequent execution of a memory wait instruction by the first process. The processor device is further to execute, by the hypervisor, the memory monitor instruction to cause the memory range to be monitored for a store command to the memory range. The processor device is further to return control, by the hypervisor, to the first process to begin execution at an instruction after the memory monitor instruction.

In another example a computer program product is provided. The computer program product is stored on a non-transitory computer-readable storage medium and includes instructions to cause a processor device to determine, by a hypervisor executing on the processor device, that a first process executing in a VM attempted to execute a memory monitor instruction. The instructions further cause the processor device to determine a memory range associated with the memory monitor instruction. The instructions further cause the processor device to alter a VMCS that corresponds to the VM to prevent a VMEXIT upon a subsequent execution of a memory wait instruction by the first process. The instructions further cause the processor device to execute, by the hypervisor, the memory monitor instruction to cause the memory range to be monitored for a store command to the memory range. The instructions further cause the processor device to return control, by the hypervisor, to the first process to begin execution at an instruction after the memory monitor instruction.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
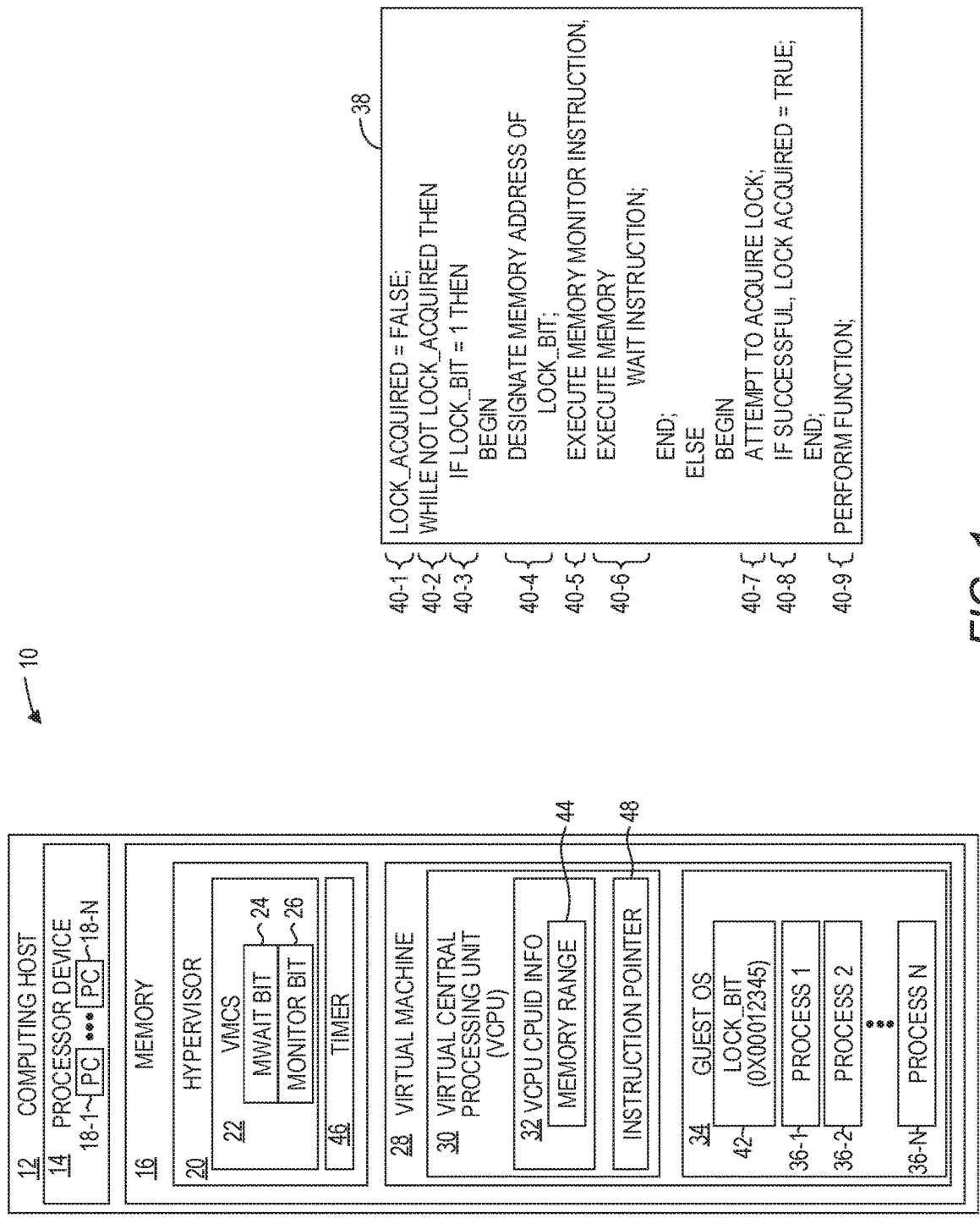
FIG. 1 is a block diagram of an environment in which examples disclosed herein may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Modern computing devices can be configured with substantial amounts of memory, and include one or more processing devices, each of which may have multiple processor cores that can process executable software instructions concurrently. A virtualized environment, such as an environment running multiple virtual machines on a single computing host, generally facilitate more efficient utilization of hardware by sharing processor cores and memory across multiple different virtual machines.

Virtual machine technologies utilize a virtual machine manager, referred to herein as a hypervisor, to implement multiple virtual machines on a computing host. Each virtual machine is a standalone independent environment that runs its own operating system, and different virtual machines on the same computing host may run different operating systems. Virtualization technologies are widely used, including in cloud computing environments, to efficiently utilize the compute resources of a computing host.

The hypervisor allocates memory to each virtual machine and time-shares the processor cores of a computing host among multiple different processes (sometimes referred to herein as "threads"). Certain processor instructions, such as an MWAIT instruction in an Intel® x86 instruction set, stop a processor core from executing and may put the processor core in a C-state (i.e., a low-power state or a power-optimized state) until some event, such as a store to a memory range, occurs. While this is useful from a stand-alone program standpoint, in a virtualized environment where a processor core can be time-shared among thousands of different threads, such processor instructions can inhibit overall performance by making it appear that a processor core that is in fact performing no action cannot be used to process some other thread. Consequently, some hypervisors do not expose the functionality of certain processor instructions, such as the monitor instruction and the mwait instruction, to virtualized environments. Attempted execution of such a processor instruction by a process in a virtual machine will result in a virtual machine exit (VMEXIT), i.e., an exit from the virtual machine to the hypervisor, which may then take any desired action.

The examples disclosed herein facilitate a controlled use of memory monitor instructions and memory wait instructions in a virtualized environment, allowing power-optimized execution of a processor core by a virtual machine but controlling such use to ensure the capability is not abused.

In particular, a hypervisor facilitates the controlled use, in a virtual machine, of a memory wait instruction that stops the execution of a processor core for a predetermined period of time. After the passage of the predetermined period of time, the hypervisor causes the processor core to awaken at which time the processor core can be allocated to another process or allocated to the same process that implemented the monitor wait instruction, to continue execution after the monitor wait instruction. The examples disclosed herein thus facilitate the use of a monitor wait instruction in a virtualized environment, but limit the ability of a process to tie up a processor core and prevent the processor core from being shared among other threads executing on the computing host.

FIG. 1 is a block diagram of an environment 10 in which examples disclosed herein may be practiced. The environment 10 includes a computing host 12 which in turn includes a processor device 14 and a memory 16. The processor device 14 includes a plurality of processor cores 18-1-18-N. The computing host 12 includes virtualization technology implemented in part by a virtual machine monitor referred to herein as a hypervisor 20. The virtualization technology may comprise, by way of non-limiting example, Red Hat Enterprise Linux virtualization technology, VMware® virtualization technology, Microsoft® Hyper-V virtualization technology, Oracle VM Server for SPARC virtualization technology, or the like.

In this example, the hypervisor 20 receives a request to initiate a virtual machine (VM). The request may be programmatic or may be made by an operator via a user interface. The hypervisor 20 generates a virtual machine control structure (VMCS) 22 that will be associated with a virtual central processing unit (VCPU) of the VM, and which controls certain operating aspects of processes of the VM when executing on a processor core 18. One such operating aspect relates to the use, by a process in the VM, of a memory monitor instruction and a memory wait instruction. The phrase "memory monitor instruction" and "memory wait instruction" refers to a pair of memory instructions that work in conjunction with each other in the following manner. The memory monitor instruction "arms" a designated address range of memory. The memory wait instruction stops a processor core 18, and may put the processor core 18 in a C-state (i.e., a low-power state) until a store operation occurs to the address range of memory armed by the memory monitor instruction. The monitor instruction of the Intel® x86 instruction set is an example of a memory monitor instruction, and the mwait instruction of the x86 instruction set is an example of a memory wait instruction; however, the examples herein are not limited to any particular instruction set.

The hypervisor 20 generates the contents of the VMCS 22 such that attempted execution of a memory monitor instruction or attempted execution of a memory wait instruction by a process executing in the VM will cause a VMEXIT. A VMEXIT results in an interrupt that causes control to transfer from the process attempting to execute the memory monitor instruction or the memory wait instruction to the hypervisor 20. In one implementation, the hypervisor 20 may set a mwait bit 24 (i.e., set the mwait bit 24 to a value of "1") of the VMCS 22 to cause a VMEXIT upon an attempted execution of a memory wait instruction and set a monitor bit 26 of the VMCS 22 to cause a VMEXIT upon an attempted execution of a memory monitor instruction.

The hypervisor 20 initiates a VM 28 and provides the VM 28 a virtual central processing unit (VCPU) 30. The VCPU 30 is a construct used by the hypervisor 20 to allocate processing time to the VM 28 on one of the processor cores 18. The VCPU 30 has associated VCPU CPUID information 32 (hereinafter CPUID information 32 for the sake of brevity) that contains information about the VCPU 30. The hypervisor 20 may alter a predetermined field of the CPUID information 32 to indicate to a process executing in the VM 28 the availability of the memory monitor instruction and memory wait instruction functionality described herein. The CPUID information 32 may be altered prior to or subsequent to the initiation of the VM 28. A process executing in the VM 28 may subsequently use a CPUID instruction to query the CPUID information 32 to determine whether the memory monitor instruction and memory wait instruction functionality described herein is available. While CPUID information 32 represents one way to advertise the memory monitor instruction and memory wait instruction functionality to a process executing in the VM 28, the examples disclosed herein are not limited to any particular mechanism for communicating information from the hypervisor 20 to a process executing in the VM 28. Moreover, in some implementations, no advertising of the capability may be necessary because it may be known that the hypervisor 20 unconditionally provides such memory monitor instruction and memory wait instruction functionality.

A guest OS 34 is initiated in the VM 28. The guest OS 34 includes, or initiates, a plurality of processes 36-1, 36-2-36-N (generally, processes 36) that perform some task which requires synchronization such that no two processes 36 are performing the task at the same time. The task can be any desired task, such as an update of memory, a disk access, a database access, utilization of some peripheral, or the like. It will be noted that while for purposes of illustration the examples herein are illustrated in conjunction with using the memory monitor instruction and memory wait instruction to acquire a lock, the examples are not limited to the acquisition of a lock, and have applicability to other uses, such as, by way of non-limiting example, memory monitoring.

To ensure such synchronization, each of the processes 36 follows a predetermined protocol 38 using a memory monitor instruction and memory wait instruction to acquire a lock that ensures that only one process 36 performs the task at one time. The predetermined protocol 38 includes a plurality of pseudocode instructions 40-1-40-9, (hereinafter instructions 40-1-40-9 for the sake of brevity). It will be understood that each instruction 40-1-40-9 constitutes a high-level description of functionality and that, when implemented in a desired programming language, any single instruction 40-1-40-9 may be implemented by one or more actual programming instructions.

For purposes of illustration assume that the process 36-2 first acquires the lock by setting a LOCK_BIT 42 to a value of 1. The process 36-1 subsequently begins executing the instructions 40-1-40-9 in order to acquire the lock. The instruction 40-1 sets a variable LOCK_ACQUIRED to a value of false. The instruction 40-2 begins a loop that encompasses instructions 40-2-40-8 that will be repeated until the variable LOCK_ACQUIRED has a value of true. The instruction 40-3 checks the value of the LOCK_BIT 42. If the LOCK_BIT 42 has a value of 1 at this point, then the lock has already been acquired by one of the other processes 36-2-36-N and cannot currently be acquired by the process 36-1. In this example, the process 36-2 has previously set the LOCK_BIT 42 to a value of 1. The instruction 40-4 designates a memory range that will be used in a subsequent memory monitor instruction. In one implementation, the process 36-1 may identify a memory range 44 by altering the CPUID information 32. A memory range 44 identifies a range of memory addresses, and includes the address of the LOCK_BIT 42 (e.g., memory address 0x00012345). The process 36-1 next attempts to execute the instruction 40-5. The instruction 40-5 is the memory monitor instruction that works in conjunction with the designated memory range 44. As discussed above, when the hypervisor 20 generated the VMCS 22, the hypervisor 20 set the monitor bit 26, and thus, when the process 36-1 attempts to execute the instruction 40-5, a VMEXIT occurs.

The hypervisor 20 determines that the VMEXIT was caused by the process 36-1 attempting to execute a memory monitor instruction. The hypervisor 20 determines what memory range was designated by the process 36-1 by accessing the memory range 44 of the CPUID information 32. The hypervisor 20 then performs a series of actions prior to returning control to the process 36-1. It is noted that the series of actions can be performed in any order. The hypervisor 20 executes the memory monitor instruction on the memory range 44. The memory monitor instruction arms a monitoring function of the processor device 14 that monitors the designated memory range 44 and causes an event upon the occurrence of a memory store (i.e., the execution of a store command) to any memory address within the memory range 44. The hypervisor 20 also alters the VMCS 22 of the VM 28 to prevent a VMEXIT upon a subsequent execution of a memory wait instruction by the process 36-1. In this example, the hypervisor 20 resets the mwait bit 24 (i.e., sets the value of the mwait bit 24 to 0). The hypervisor 20 sets a timer 46 that is associated with the VCPU 30 to some predetermined value and starts the timer 46. In some examples, the predetermined value may be configurable by an operator of the computing host 12. The hypervisor 20 also increments an instruction pointer 48 that identifies the location of the next instruction to be executed by the process 36-1 to point to the instruction that follows the memory monitor instruction. The hypervisor 20 then returns control to the process 36-1 to begin execution at the instruction after the memory monitor instruction.

The process 36-1 executes the instruction 40-6, which is the memory wait instruction. The memory wait instruction causes the process 36-1 to enter a wait state and does not cause a VMEXIT because the hypervisor 20 reset the mwait bit 24 to prevent a VMEXIT upon execution of the memory wait instruction. The memory wait instruction is a "hint" to the processor device 14 that the processor core 18 that is currently executing the process 36-1 may be put into a C-state (idle state). The processor core 18 that is currently executing the process 36-1 stops processing to wait until a memory store operation occurs to any memory address within the memory range 44. To the hypervisor 20, the processor core 18 appears to be executing the process 36-1, but in fact, the processor core 18 is in a wait state, and possibly a C-state, and, while in such wait state, is not actively executing any instructions of any process on the computing host 12.

Several events may subsequently occur. One such event is that the process 36-2, which currently has acquired the lock, releases the lock by resetting the LOCK_BIT 42 (i.e., executes a memory store to store the value 0 in the LOCK_BIT 42). The monitoring function of the processor device 14 that monitors the designated memory range 44 detects the memory store to the memory range 44 and causes an event that causes the process 36-1 to leave the wait state and begin execution at the next instruction. In this example, the process 36-1 returns to the instruction 40-2. Because the variable LOCK_ACQUIRED still has a value of false, the process 36-1 executes the instruction 40-3. The LOCK_BIT 42 may now have a value of 0 if no other process 36 acquired the lock in the interim since the process 36-2 released the lock. If the LOCK_BIT 42 has a value of 0, the process 36-1 executes the instruction 40-7 and attempts to acquire the lock. The process to acquire the lock may include, for example, reading the LOCK_BIT 42 to ensure the LOCK_BIT 42 has a value of 0, and, if so, writing a value of 1 to the LOCK_BIT 42. The instruction 40-8 is then executed, which sets the value of the variable LOCK_ACQUIRED to a value of true. The instruction 40-2 is then executed. Because the variable LOCK_ACQUIRED has a value of true, execution passes to the instruction 40-9, which represents the instructions used to perform the task that is to be performed upon acquisition of the lock.

In this situation, where a memory store causes the event that causes the process 36-1 to leave the wait state, the timer 46 may continue running. Upon expiration of the timer 46, the hypervisor 20 may, as described below, alter the VMCS 22 to cause a VMEXIT upon a subsequent execution of a memory wait instruction of the process 36-1. The hypervisor 20 then reads the value of the LOCK_BIT 42 and stores (i.e., a memory store) the value of the LOCK_BIT 42 in the LOCK_BIT 42. However, in this situation, because the process 36-1 has already continued execution, the memory store by the hypervisor 20 essentially serves as a no operation.

A second event that may occur after the process 36-1 executes the instruction 40-6, is that the timer 46 may expire before the process 36-2 releases the lock. In this situation, the hypervisor 20 alters the VMCS 22 to cause a VMEXIT upon a subsequent execution of a memory wait instruction of the process 36-1. The hypervisor 20 then reads the value of the LOCK_BIT 42 and stores the value of the LOCK_BIT 42 in the LOCK_BIT 42. This ensures that the value of the LOCK_BIT 42 is not changed by the hypervisor 20, but also causes the monitoring function of the processor device 14 to detect the memory store to the memory range 44 and cause an event that causes the process 36-1 to leave the wait state and begin execution at the next instruction. The processor core 18 then immediately becomes available for timesharing. The processor core 18 may be allocated to another thread (i.e., process), or may continue to execute the process 36-1 depending on the current demands of the various threads executing on the computing host 12. Thus, even if the process 36-2 never releases the lock, the processor core 18 has not been tied up by the process 36-1 for a period of time longer than that of the timer 46. The process 36-1 returns to the instruction 40-2 and repeats the actions discussed above until the process 36-1 is able to acquire the lock and perform the instruction 40-8.

Figure 2:
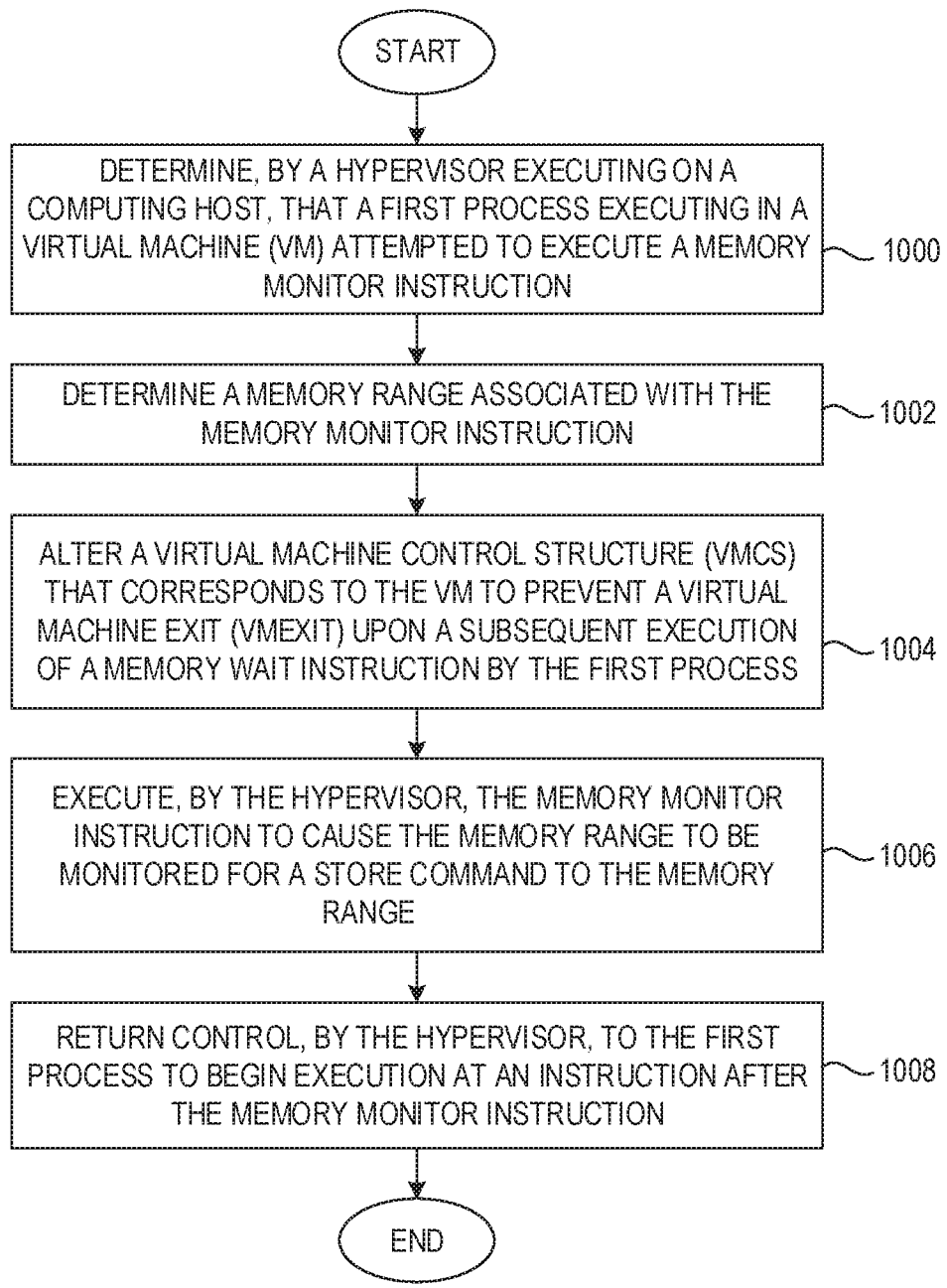
FIG. 2 is a flowchart of a method for controlled use of a memory monitor instruction and memory wait instruction in a virtualized environment according to one example.

FIG. 2 is a flowchart of a method for controlled use of a memory monitor instruction and memory wait instruction in a virtualized environment according to one example. FIG. 2 will be discussed in conjunction with FIG. 1. The hypervisor 20 determines that the process 36-1, executing in the VM 28, attempted to execute a memory monitor instruction (FIG. 2, block 1000). The hypervisor 20 determines the memory range 44 associated with the memory monitor instruction (FIG. 2, block 1002). The hypervisor 20 alters the VMCS 22 that corresponds to the VM 28 to prevent a VMEXIT upon a subsequent execution of a memory wait instruction by the process 36-1 (FIG. 2, block 1004). The hypervisor 20 executes the memory monitor instruction to cause the memory range 44 to be monitored for a store command to the memory range 44 (FIG. 2, block 1006). The hypervisor 20 returns control to the process 36-1 to begin execution at an instruction 40 after the memory monitor instruction (FIG. 2, block 1008).

FIGS. 3A-3D are a message sequence diagram that illustrates actions by various components illustrated in the environment 10 and messages communicated between such components during a controlled use of a memory monitor instruction and memory wait instruction in a virtualized environment according to one example. FIGS. 3A-3D will be discussed in conjunction with FIG. 1. The hypervisor 20 receives a request to initiate a VM (step 2000). The hypervisor 20 generates the VMCS 22 such that the memory monitor instruction and the memory wait instruction by a process 36 executing in the VM cause a VMEXIT (step 2002). The hypervisor 20 alters the CPUID information 32 of the VCPU 30 to advertise the availability of the memory monitor instruction and memory wait instruction functionality (step 2004). In one implementation, the hypervisor 20 may by convention alter a value of a field in the CPUID information 32 to advertise the availability of the memory monitor instruction and the memory wait instruction functionality. The hypervisor 20 initiates the VM 28 (step 2006).

The process 36-1 initiates in the VM 28 (step 2008). The process 36-2 initiates in the VM 28 (step 2010). The process 36-2 accesses the CPUID information 32 and determines that the memory monitor instruction and the memory wait instruction functionality is available (step 2012). The process 36-1 also accesses the CPUID information 32 and determines that the memory monitor instruction and the memory wait instruction functionality is available (step 2014). The process 36-2 acquires the lock by setting the LOCK_BIT 42 to a value of 1 (step 2016). The process 36-1 also attempts to acquire the lock but determines that the lock is acquired by determining that the LOCK_BIT 42 has a value of 1 (step 2018).

The process 36-1 sets the memory range 44 to include the address of the LOCK_BIT 42 (e.g., memory address 0x00012345 in this example) (step 2020). The process 36-1 then attempts to execute the memory monitor instruction (step 2022). The attempted execution of the memory monitor instruction causes a VMEXIT and control returns to the hypervisor 20. The hypervisor 20 determines that the VMEXIT was caused by the process 36-1 attempting to execute the memory monitor instruction (step 2024). The hypervisor 20 alters the VMCS 22 to prevent a VMEXIT upon the process 36-1 subsequently executing the memory wait instruction (step 2026).

Figure 3A:
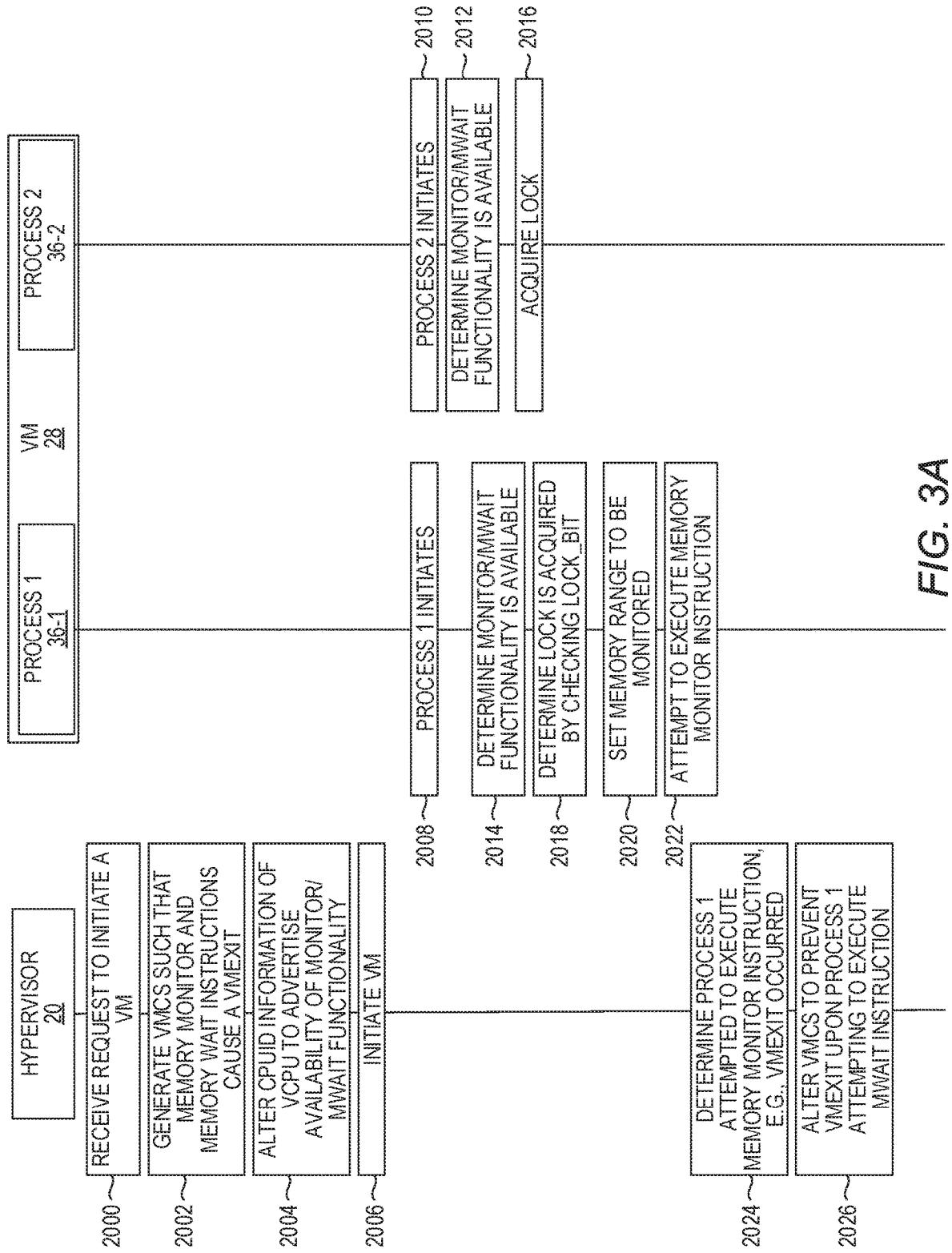
FIGS. 3A-3D are a message sequence diagram that illustrates actions by and messages communicated between various components illustrated in the environment during a controlled use of a memory monitor instruction and memory wait instruction in a virtualized environment according to one example.
Figure 3B:
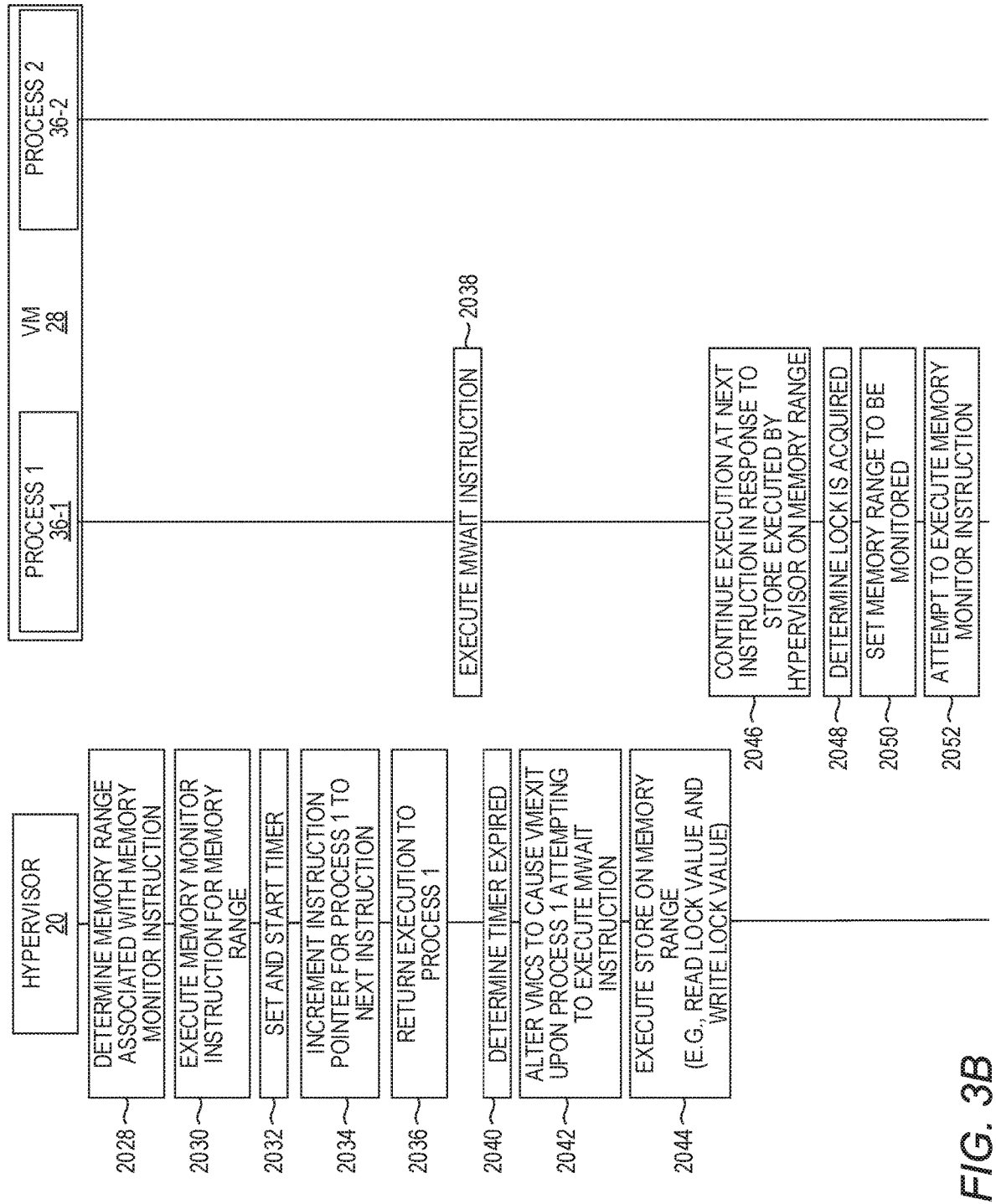
Figure 3C:
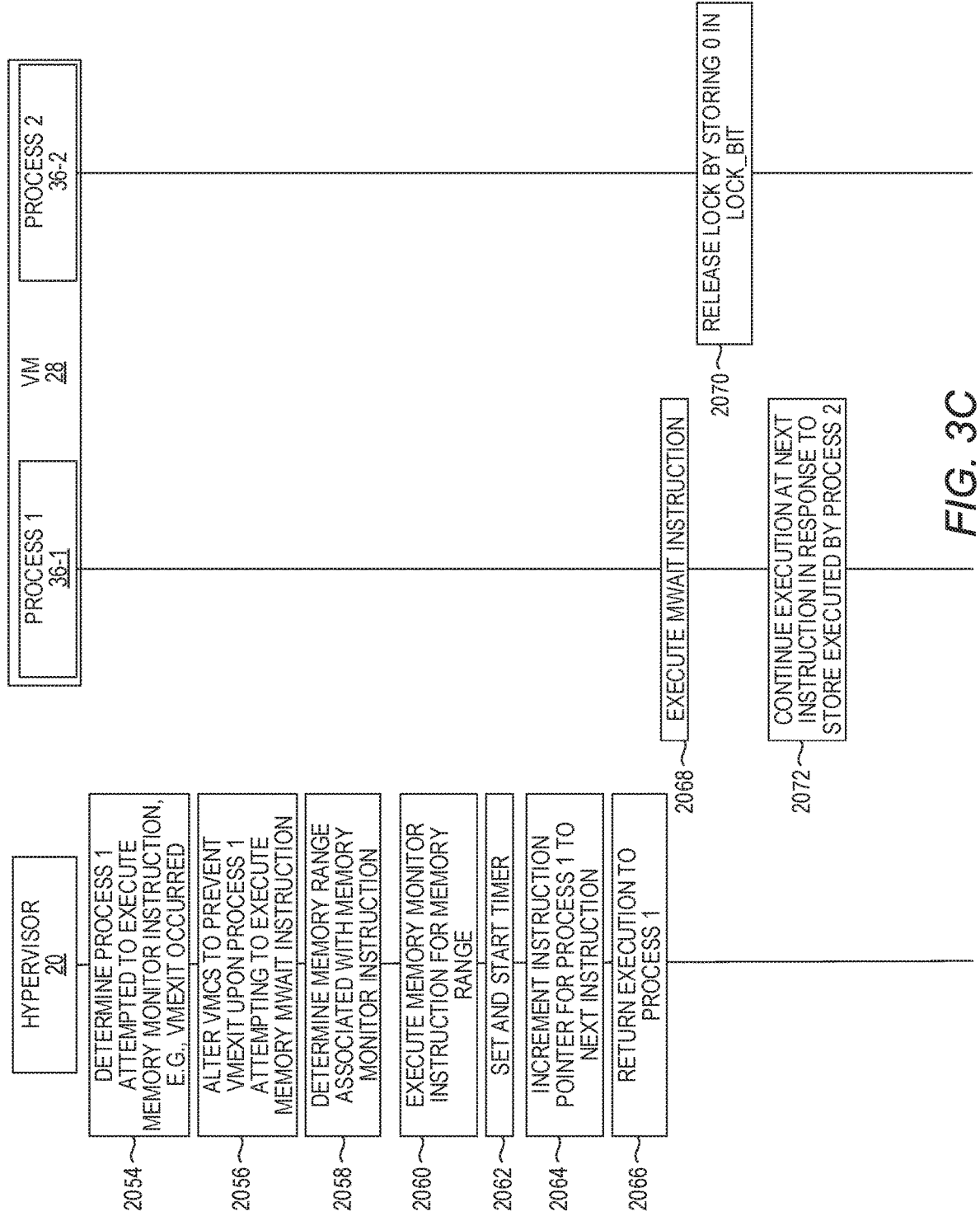

Referring now to FIG. 3B, the hypervisor 20 determines the memory range 44 associated with the memory monitor instruction (step 2028). The hypervisor 20 executes the memory monitor instruction for the memory range 44, thereby arming the memory monitor of the processor device 14 to monitor the memory range 44 (step 2030). The hypervisor 20 sets and starts the timer 46 (step 2032). The value of the timer 46 may be any desired value, and may vary depending on the current load of the computing host 12. If the computing host 12 is heavily loaded, the hypervisor 20 may set the timer 46 to a lower value than if the computing host 12 is lightly loaded. In some implementations, the value of the timer 46 may be operator configurable.

The hypervisor 20 increments the instruction pointer 48 to point to the instruction that follows the memory monitor instruction (step 2034). The hypervisor 20 returns execution to the process 36-1 (step 2036). The process 36-1 then executes the memory wait instruction (step 2038). Because the hypervisor 20 altered the VMCS 22 to prevent a VMEXIT upon the process 36-1 executing the memory wait instruction, the execution of the memory wait instruction puts the process 36-1 in a wait state, and places the processor core 18 executing the process 36-1 in a C-state (i.e., an idle state).

After a period of time the hypervisor 20 determines that the timer 46 has expired (step 2040). The hypervisor 20 alters the VMCS 22 to cause a VMEXIT if the process 36-1 subsequently executes a memory wait instruction (step 2042). This is to ensure that the process 36-1 follows the proper protocol and first attempts to execute a memory monitor instruction prior to executing a memory wait instruction. If the process 36-1 fails to follow the protocol and attempts to execute the memory wait instruction without first attempting to execute the memory monitor instruction, a VMEXIT occurs, and the hypervisor 20 may simply terminate the process 36-1, or perform some other desired action.

The hypervisor 20 reads the LOCK_BIT 42 and then stores the value of the LOCK_BIT 42 back into the LOCK_BIT 42 (step 2044). The memory monitor detects the memory store to the address range 44, and causes the process 36-1 to begin executing the instruction after the memory wait instruction (step 2046). This action also makes the processor core 18 available for re-allocation to another thread (i.e., process) executing on the computing host 12, if desired. The process 36-1 then attempts to acquire the lock, and determines that the LOCK_BIT 42 has a value of 1, and that the lock is thus acquired by another process 36 (step 2048). The process 36-1 sets the memory range 44 to include the address of the LOCK_BIT 42 (step 2050). The process 36-1 then attempts to execute the memory monitor instruction (step 2052). The attempted execution of the memory monitor instruction causes a VMEXIT, and control returns to the hypervisor 20.

The hypervisor 20 determines that the VMEXIT was caused by the process 36-1 attempting to execute the memory monitor instruction (step 2054). The hypervisor 20 alters the VMCS 22 to prevent a VMEXIT upon the process 36-1 subsequently executing the memory wait instruction (step 2056). The hypervisor 20 determines the memory range 44 associated with the memory monitor instruction (step 2058). The hypervisor 20 executes the memory monitor instruction for the memory range 44, thereby arming the memory monitor of the processing device 14 to monitor the memory range 44 (step 2060). The hypervisor 20 sets and starts the timer 46 (step 2062). The hypervisor 20 increments the instruction pointer 48 to point to the instruction that follows the memory monitor instruction (step 2064). The hypervisor 20 returns execution to the process 36-1 (step 2066). The process 36-1 then executes the memory wait instruction (step 2068).

Figure 3D:
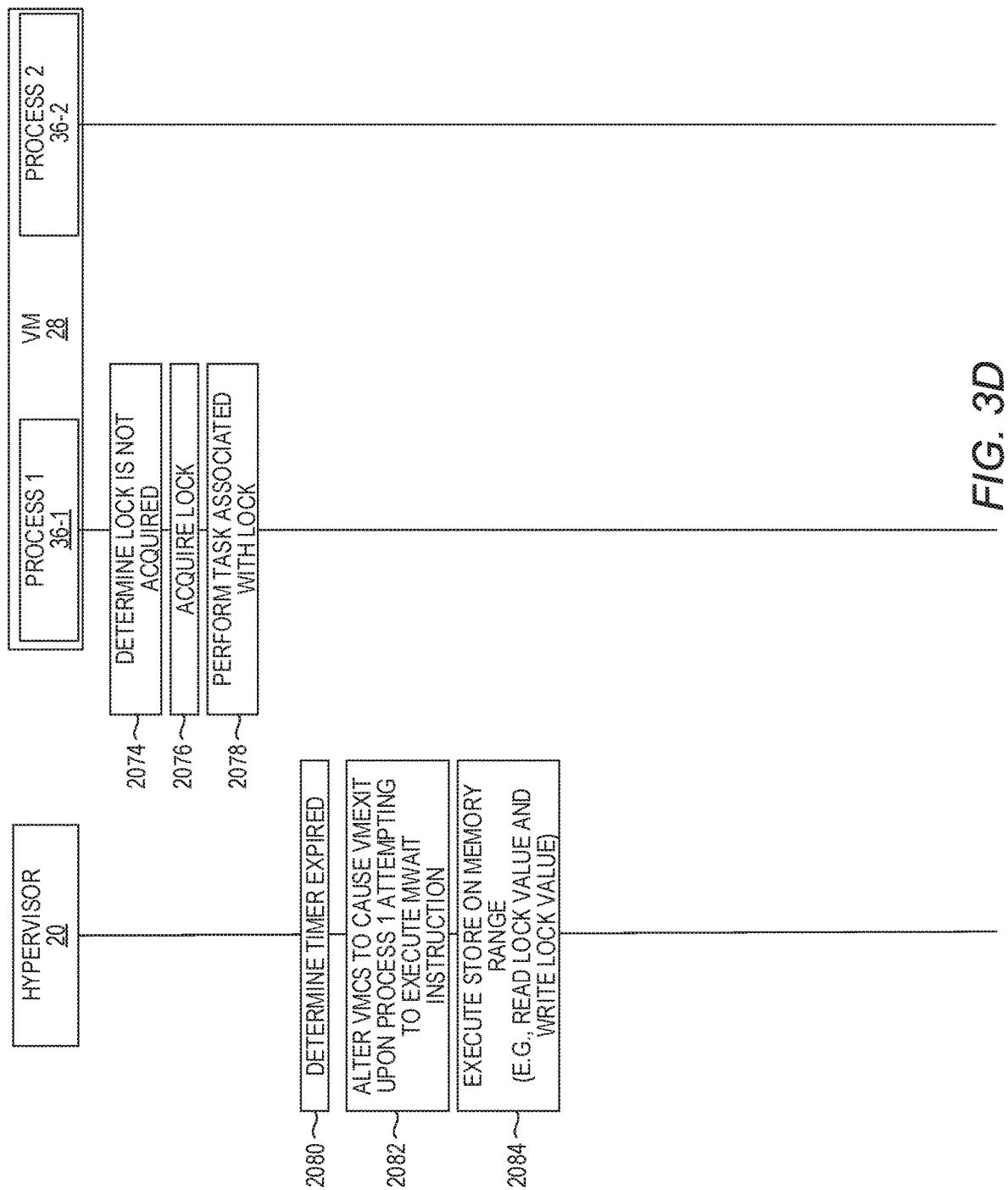

The process 36-2 releases the lock by storing a value of 0 in the LOCK_BIT 42 (step 2070). The memory monitor detects the memory store to the address range 44, and causes the process 36-1 to begin executing the instruction after the memory wait instruction (step 2072). Referring now to FIG. 3D, the process 36-1 determines that the lock is not currently acquired, and then acquires the lock by setting the LOCK_BIT 42 to a value of 1 (steps 2074, 2076). The process 36-1 then performs the task that is associated with the lock (step 2078). Subsequently, the hypervisor 20 determines that the timer 46 has expired (step 2080). The hypervisor 20 alters the VMCS 22 to cause a VMEXIT if the process 36-1 subsequently executes a monitor wait instruction (step 2082). The hypervisor 20 reads the LOCK_BIT 42 and then stores the value of the LOCK_BIT 42 back into the LOCK_BIT 42 (step 2084). If no process 36 is currently in a wait state, this has no effect.

In examples where multiple VMs are concurrently executing on the computing host 12, it is possible that after the hypervisor 20 sets the timer 46 and before the process 36-1 executes the memory wait instruction, the process 36-1 is swapped off the processor core 18 on which the process 36-1 is executing, and a second process from another VM begins executing on such processor core 18. If such second process executes a memory monitor instruction, the hypervisor 20 may query the timer 46 and determine that the timer 46 had been previously set and has not yet expired. In this situation, the hypervisor 20 may turn off the timer 46 and set the mwait bit 24 of the VMCS 22 so that if the process 36-1 subsequently executes the memory wait instruction, a VMEXIT will occur. The hypervisor 20 may then process the memory monitor instruction of the second process from the other VM in the manner discussed above with regard to FIGS. 3A-3D. If the process 36-1 subsequently attempts to execute the memory wait instruction prior to first executing a memory monitor instruction, a VMEXIT occurs. In this situation, the hypervisor 20 merely advances the instruction counter so that the process 36-1 begins execution at the instruction that follows the memory wait instruction, essentially making the attempted execution of the memory wait instruction a null operation.

Figure 4:
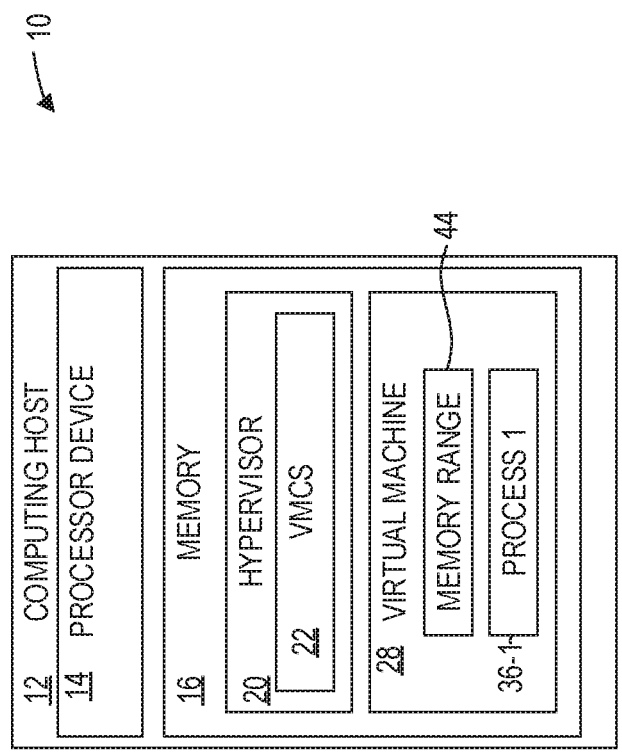
FIG. 4 is a simplified block diagram of the environment illustrated in FIG. 1 according to one implementation.

FIG. 4 is a simplified block diagram of the environment 10 illustrated in FIG. 1 according to one implementation. The environment 10 includes the computing host 12, which in turn includes the memory 16 and the processor device 14 coupled to the memory 16. The processor device 14 is to determine, by the hypervisor 20, that the process 36-1 executing in the VM 28 attempted to execute a memory monitor instruction. The processor device 14 is further to determine the memory range 44 associated with the memory monitor instruction. The processor device 14 is further to alter the VMCS 22 that corresponds to the VM 28 to prevent a VMEXIT upon a subsequent execution of a memory wait instruction by the process 36-1. The processor device 14 is further to execute, by the hypervisor 20, the memory monitor instruction to cause the memory range 44 to be monitored for a store command to the memory range 44. The processor device 14 is further to return control to the process 36-1 to begin execution at an instruction after the memory monitor instruction.

Figure 5:
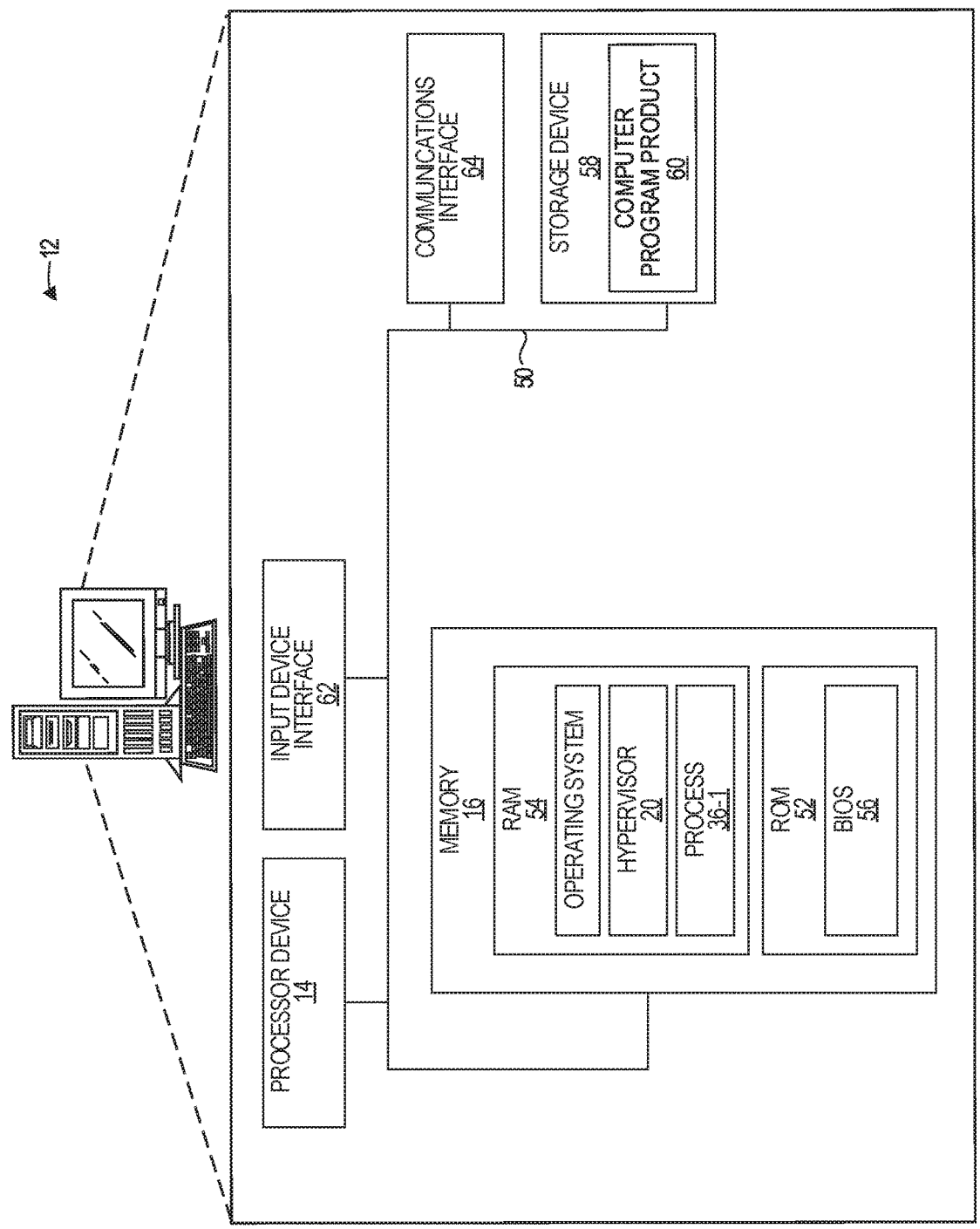
FIG. 5 is a block diagram of a computing host suitable for implementing examples according to one example.

FIG. 5 is a block diagram of the computing host 12 suitable for implementing examples according to one example. The computing host 12 may comprise any computing or electronic device capable of including firmware, hardware, and/or executing software instructions to implement the functionality described herein, such as a computer server, a desktop computing device, a laptop computing device, or the like. The computing host 12 includes the processor device 14, the memory 16, and a system bus 50. The system bus 50 provides an interface for system components including, but not limited to, the memory 16 and the processor device 14. The processor device 14 can be any commercially available or proprietary processor that implements a memory monitor instruction and a memory wait instruction as described herein.

The system bus 50 may be any of several types of bus structures that may further interconnect to a memory bus (with or without a memory controller), a peripheral bus, and/or a local bus using any of a variety of commercially available bus architectures. The memory 16 may include non-volatile memory 52 (e.g., read-only memory (ROM), erasable programmable read-only memory (EPROM), electrically erasable programmable read-only memory (EEPROM), etc.), and volatile memory 54 (e.g., random-access memory (RAM)). A basic input/output system (BIOS) 56 may be stored in the non-volatile memory 52 and can include the basic routines that help to transfer information between elements within the computing host 12. The volatile memory 54 may also include a high-speed RAM, such as static RAM, for caching data.

The computing host 12 may further include or be coupled to a non-transitory computer-readable storage medium such as a storage device 58, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 58 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 58 and in the volatile memory 54, including an operating system and one or more program modules, such as the hypervisor 20, which may implement the functionality described herein in whole or in part.

All or a portion of the examples may be implemented as a computer program product 60 stored on a transitory or non-transitory computer-usable or computer-readable storage medium, such as the storage device 58, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the hypervisor 20 in the volatile memory 54, may serve as a controller, or control system, for the computing host 12 that is to implement the functionality described herein.

An operator may also be able to enter one or more configuration commands through a keyboard, a pointing device such as a mouse (not illustrated), or a touch-sensitive surface such as a display device. Such input devices may be connected to the processor device 14 through an input device interface 62 that is coupled to the system bus 50 but can be connected by other interfaces such as a parallel port, an Institute of Electrical and Electronic Engineers (IEEE) 1394 serial port, a Universal Serial Bus (USB) port, an IR interface, and the like. The computing host 12 may also include a communications interface 64, such as an Ethernet transceiver, suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   determining, by a hypervisor executing on a computing host, that a first process executing in a virtual machine (VM) attempted to execute a memory monitor instruction;
   determining a memory range associated with the memory monitor instruction;
   altering a virtual machine control structure (VMCS) that corresponds to the VM to prevent a virtual machine exit (VMEXIT) upon a subsequent execution of a memory wait instruction by the first process;
   executing, by the hypervisor, the memory monitor instruction to cause the memory range to be monitored for a store command to the memory range; and
   returning control, by the hypervisor, to the first process to begin execution at an instruction after the memory monitor instruction.

2. The method of claim 1 further comprising:
   setting, by the hypervisor, a timer;
   determining, by the hypervisor, that the timer has expired;
   altering, by the hypervisor, the VMCS to cause a VMEXIT upon a subsequent execution of a memory wait instruction by the first process; and
   storing, by the hypervisor, data in a memory location within the memory range.

3. The method of claim 1 wherein determining, by the hypervisor, that the first process attempted to execute the memory monitor instruction comprises determining that the first process caused a VMEXIT by attempting to execute the memory monitor instruction.

4. The method of claim 1 wherein determining a memory range associated with the memory monitor instruction comprises accessing central processing unit identification (CPUID) information associated with a virtual central processing unit of the VM.

5. The method of claim 1 further comprising:
   determining that a timer has expired;
   altering the VMCS to cause a VMEXIT upon a subsequent execution of a memory wait instruction by the first process; and
   storing, by the hypervisor, data in a memory location within the memory range.

6. The method of claim 5 further comprising:
   reading, by the hypervisor, the memory location in the memory range, the memory location comprising a lock bit; and
   determining a value of the lock bit; and
   wherein storing, by the hypervisor, data in the memory location within the memory range comprises storing the value of the lock bit in the memory location.

7. The method of claim 1 wherein the memory monitor instruction is an x86 instruction set MONITOR instruction.

8. The method of claim 1 wherein the memory wait instruction is an x86 instruction set MWAIT instruction.

9. The method of claim 1 further comprising:
   receiving a request to initiate the VM;
   generating the VMCS such that attempted execution of the memory monitor instruction or attempted execution of the memory wait instruction by a process executing in the VM causes a VMEXIT; and
   initiating the VM.

10. The method of claim 9 further comprising:
    altering CPUID information associated with a virtual central processing unit of the VM to indicate a memory monitor instruction and memory wait instruction capability.

11. The method of claim 1 further comprising:
    receiving a request to initiate the VM;
    altering CPUID information associated with a virtual central processing unit of the VM to indicate a memory monitor instruction and memory wait instruction capability; and
    initiating the VM.

12. The method of claim 1 further comprising:
    prior to returning control to the first process, incrementing an instruction counter that identifies a next instruction to execute of the first process to a location past the memory monitor instruction.

13. The method of claim 1 further comprising:
    determining, by the first process, that a lock bit indicates that a lock has been acquired by another process; and
    in response to determining that the lock has been acquired by another process:
      associating, by the first process, the memory range with the memory monitor instruction, the memory range including the lock bit; and
      attempting to execute the memory wait instruction, the attempt to execute the memory wait instruction causing a VMEXIT.

14. The method of claim 13, further comprising subsequent to the hypervisor returning control to the first process, executing, by the first process, the memory wait instruction, execution of the memory wait instruction causing the first process to enter a wait state and not causing a VMEXIT.

15. The method of claim 14 further comprising:
leaving, by the first process, the wait state;
determining, by the first process, that the lock bit indicates that the lock has been acquired by another process; and
in response to determining that the lock has been acquired by another process:
  associating, by the first process, the memory range with the memory monitor instruction, the memory range including the lock bit; and
  attempting to execute the memory wait instruction, the attempt to execute the memory wait instruction causing a VMEXIT.

16. The method of claim 14 further comprising:
leaving, by the first process, the wait state;
determining, by the first process, that the lock bit indicates that the lock has not been acquired by another process; and
acquiring the lock.

17. A computing host, comprising:
a memory; and
a processor device coupled to the memory to:
  determine, by a hypervisor executing on the processor device, that a first process executing in a virtual machine (VM) attempted to execute a memory monitor instruction;
  determine a memory range associated with the memory monitor instruction;
  alter a virtual machine control structure (VMCS) that corresponds to the VM to prevent a virtual machine exit (VMEXIT) upon a subsequent execution of a memory wait instruction by the first process;
  execute, by the hypervisor, the memory monitor instruction to cause the memory range to be monitored for a store command to the memory range; and
  return control, by the hypervisor, to the first process to begin execution at an instruction after the memory monitor instruction.

18. The computing host of claim 17 wherein the processor device is further to:
  set, by the hypervisor, a timer;
  determine, by the hypervisor, that the timer has expired;
  alter, by the hypervisor, the VMCS to cause a VMEXIT upon a subsequent execution of a memory wait instruction by the first process; and
  store, by the hypervisor, data in a memory location within the memory range.

19. The computing host of claim 17 wherein to determine, by the hypervisor, that the first process attempted to execute the memory monitor instruction, the processor device is further to determine that the first process caused a VMEXIT by attempting to execute the memory monitor instruction.

20. A computer program product stored on a non-transitory computer-readable storage medium and including instructions to cause a processor device to:
  determine, by a hypervisor executing on the processor device, that a first process executing in a virtual machine (VM) attempted to execute a memory monitor instruction;
  determine a memory range associated with the memory monitor instruction;
  alter a virtual machine control structure (VMCS) that corresponds to the VM to prevent a virtual machine exit (VMEXIT) upon a subsequent execution of a memory wait instruction by the first process;
  execute, by the hypervisor, the memory monitor instruction to cause the memory range to be monitored for a store command to the memory range; and
  return control, by the hypervisor, to the first process to begin execution at an instruction after the memory monitor instruction.

* * * * *